Patented Aug. 4, 1936

2,049,442

UNITED STATES PATENT OFFICE 2,049,442

NEUTRAL SALTS OF MEDICINAL ALKALOIDS AND PROCESS FOR PREPARING THE SAME

Thomas Haegland, Philadelphia, Pa., assignor to Merck & Co. Inc., Rahway, N. J., a corporation of New Jersey No Drawing. Application July 12, 1932, Serial No. 622,113

2 Claims. (Cl. 260—26)

The present invention relates to the production of a series of neutral salts of medicinal alkaloids having relatively high water-solubility, and suitable for administration by intravenous and intramuscular injection.

The more commonly employed alkaloidal salts are, as a rule, not sufficiently water-soluble in their neutral salts to adapt them to administration in such a manner in sufficient dosage as efficient therapeutic agents. The acid salts, though they may be of sufficiently high solubility, are, however, not suitable for the purposes stated.

I have now found that gluconates of various alkaloids may be produced which combine the desired properties of neutrality and relatively high water-solubility so as to make them adaptable for convenient administration by injection and in sufficient dosage for effective therapy in their several indications.

The invention is of especial interest with respect to the principal medicinal alkaloids of cinchona, since these, in their more readily soluble acid salts, are not suitable for intravenous and intramuscular injection. The gluconates which I have now produced are neutral and have a remarkably high water-solubility which makes them readily available for practically any required dosage in such administration. Thus, for instance, the cinchonidine salt prepared by me is neutral and is soluble in about three parts of water at room temperature.

Salts of other groups of medicinal alkaloids have been similarly prepared and found to possess the same required neutrality and a sufficient degree of water-solubility.

For the purpose of illustration, I shall exemplify the preferred method of practicing this invention, without, however, limiting myself to the precise steps and new products thus shown.

*Example.*—A twenty per cent. aqueous solution of gluconic acid is heated to boiling. To this is added a hot concentrated solution of quinine base in alcohol until the mixed solution reacts neutral to litmus. After this point has been reached, the mixed solution is heated for about 10 to 15 minutes longer, and is then again tested for neutrality. If at the end of this time the reaction mixture is no longer neutral, more of the hot quinine base solution in alcohol, or of the hot aqueous solution of gluconic acid, is added to produce a neutral reaction to the indicator. The solution is then treated with a little decolorizing carbon, filtered, and allowed to cool and crystallize out the formed salt, which is obtained in the form of a white or colorless crystalline, odorless powder, containing two molecules of water of crystallization. The quinine gluconate thus obtained is soluble in about five parts of water at 25° C. and in about 45 parts by weight of 95% alcohol. It chars when heated to about 100° C., but may be heated to about 80° C. without appreciable discoloration.

In carrying out the process according to the foregoing example, the strength of the solution of gluconic acid may be increased beyond the 20% as indicated, but this should not be carried too far for the reason that if the solution is made as high as, say, about 40%, some of the gluconic acid is decomposed in the solution when it is boiled.

The above described process may also be modified somewhat by using a moderately dilute aqueous solution of 1 mole equivalent of the absolute gluconic acid. After this is heated to boiling, 1 mole equivalent of hydrated quinine base, or of the anhydrous base, is gradually added in small portions, while the solution of the acid is still hot, and until a neutral reaction to litmus is attained. The reaction mixture is allowed to cool, whereupon the quinine gluconate separates out. It is then separated from the mother liquor in the usual manner. However, for practical production, I prefer the method first described without restoring to stoichiometric measurements.

The gluconates of cinchonine and cinchonidine, and their methoxy homologues, have been thus prepared by obviously appropriate adaptation of the general process above described.

The cinchonidine salt is even more soluble in water than the quinine, one gram dissolving in 3 cc. of water at room temperature. It is also a little more soluble in alcohol. It contains one molecule of water of crystallization.

Cinchonine gluconate contains no water of crystallization. It possesses the smallest solubility in water and alcohol of any of the other cinchona alkaloid gluconates, one gram requiring 11 cc. of water, and yet has a much greater water solubility than other commonly used cinchonine salts. It is soluble in alcohol about 1 gram in 90 cc.

Quinidine gluconate is also anhydrous, crystallizing without any water. It is less soluble in water and alcohol than the quinine or the cinchonidine salt, but somewhat more soluble than the cinchonine salt; one gram requires 9 cc. of water or about 75 cc. of alcohol for a solution.

It has also been found by me that analogous gluconates can be produced of the alkaloids of nux vomica, opium, etc., forming crystalline, neutral salts of relatively high water-solubility, by appropriate adaptation of the above described processes to the given alkaloid.

Strychnine gluconate, prepared analogously according to the indicated procedure, crystallizes from water with two molecules of water. It is more soluble in water than any of the cinchona alkaloid gluconates, one gram dissolving in about 2 cc. of water.

Brucine gluconate has also been produced. It has two molecules of water of crystallization and dissolves in two parts of water at room temperature. It is soluble in about 90 parts by weight in alcohol.

All of the gluconates of the alkaloids have no melting points, but are charred and decomposed at about 100° C.

Having thus set forth my invention, I request issuance of Letters Patent on the following claims:

1. As a new compound, methoxy-cinchonidine gluconate, forming an anhydrous white crystalline powder containing one molecule of water, forming aqueous solutions neutral to litmus, soluble in about nine parts of water and 75 parts of alcohol at room temperature.

2. The process of preparing neutral gluconates of alkaloids, which comprises heating a solution of gluconic acid in water, not in excess of 40% of the acid, to the boiling point, and gradually adding thereto a hot concentrated solution of an alkaloid until the mixed solutions react neutral to litmus; thereafter decolorizing and crystallizing out by known processes.

THOMAS HAEGLAND.